United States Patent
Zhang

(10) Patent No.: US 9,195,647 B1
(45) Date of Patent: Nov. 24, 2015

(54) SYSTEM, METHODS, AND DATA STRUCTURE FOR MACHINE-LEARNING OF CONTEXTUALIZED SYMBOLIC ASSOCIATIONS

(71) Applicant: Guangsheng Zhang, Palo Alto, CA (US)

(72) Inventor: Guangsheng Zhang, Palo Alto, CA (US)

( * ) Notice: Subject to any disclaimer, the term of this patent is extended or adjusted under 35 U.S.C. 154(b) by 307 days.

(21) Appl. No.: 13/802,427

(22) Filed: Mar. 13, 2013

Related U.S. Application Data

(60) Provisional application No. 61/682,205, filed on Aug. 11, 2012, provisional application No. 61/749,302, filed on Jan. 5, 2013.

(51) Int. Cl.
G06F 17/27 (2006.01)

(52) U.S. Cl.
CPC ........ *G06F 17/2785* (2013.01); *G06F 17/2795* (2013.01)

(58) Field of Classification Search
CPC .............. G06F 17/2785; G06F 17/274; G06F 17/2765; G06F 17/277; G06F 17/2795
See application file for complete search history.

(56) References Cited

U.S. PATENT DOCUMENTS

| | | | |
|---|---|---|---|
| 4,849,898 A * | 7/1989 | Adi ........................ | 707/999.005 |
| 5,128,865 A | 7/1992 | Sadler | |
| 5,930,788 A | 7/1999 | Wical | |
| 6,101,515 A | 8/2000 | Wical | |
| 6,473,753 B1 | 10/2002 | Katariya | |
| 6,487,545 B1 | 11/2002 | Wical | |
| 6,810,376 B1 * | 10/2004 | Guan et al. ........................ | 704/9 |
| 7,734,614 B2 * | 6/2010 | Aoki et al. .................... | 707/711 |
| 8,380,489 B1 * | 2/2013 | Zhang .............................. | 704/4 |
| 2003/0126561 A1 * | 7/2003 | Woehler et al. ............... | 715/531 |
| 2007/0027865 A1 * | 2/2007 | Bartz et al. ........................ | 707/5 |
| 2010/0153090 A1 * | 6/2010 | Chen et al. ........................ | 704/2 |
| 2012/0078918 A1 * | 3/2012 | Somasundaran et al. ..... | 707/748 |
| 2012/0232887 A1 * | 9/2012 | Dasgupta et al. ................. | 704/9 |

* cited by examiner

*Primary Examiner* — John Villecco

(57) ABSTRACT

A system and methods and data structure for quantitatively assessing associations between terms or symbols in natural language and non-natural language contents. Some of the terms or symbols represent objects or concepts or semantic attributes; some other terms or symbols represent properties associated with the objects or concepts or semantic attributes. The methods include obtaining a first group of text contents or non-natural language data content, specifying a target term or symbol or semantic attribute, and identifying contextual attributes of the target term or symbol. The contextual attributes include grammatical and semantic attributes as well as positional and distance attributes. Association strength values are calculated for related terms or symbols based on the contextual attributes of the target term or symbol or semantic attribute.

20 Claims, 13 Drawing Sheets

| Property Names | Object-dependent Association Strength | Internal Association Strength | External Association Strength |
|---|---|---|---|
| CPU | 0.99 | 0.99 | 0.0 |
| Motherboard | 0.90 | 0.90 | 0.0 |
| Memory | 0.95 | 0.96 | 0.01 |
| Hard disk | 0.80 | 0.81 | 0.01 |
| Operating system | 0.98 | 0.99 | 0.01 |
| Speed | 0.60 | 0.70 | 0.10 |
| Multimedia | 0.5 | 0.65 | 0.015 |
| Case | 0.2 | 0.22 | 0.02 |
| Software | 0.7 | 0.71 | 0.01 |
| Color | 0.3 | 0.35 | 0.05 |
| Unix | 0.5 | 0.51 | 0.01 |
| Microsoft | 0.8 | 0.85 | 0.05 |
| …… | …… | …… | …… |
| | | | |
| | | | |

Figure 5

Object or concept name:

Computer

| Property Names | Association Strength 1 | Association Strength 2 |
|---|---|---|
| CPU | 0.99 | 0.86 |
| motherboard | 0.90 | 0.95 |
| memory | 0.95 | 0.65 |
| hard disk | 0.80 | 0.50 |
| operating system | 0.98 | 0.98 |
| speed | 0.60 | 0.70 |
| multi-media | 0.50 | 0.40 |
| case | 0.2 | 0.56 |
| software | 0.7 | 0.35 |
| color | 0.3 | 0.2 |
| UNIX | 0.5 | 0.3 |
| Microsoft | 0.8 | 0.6 |
| …… | …… | …… |

Figure 9

Object or concept name:

|  | Computer | USB Drive | Keyboard |
|---|---|---|---|
| computer | 1 | 1 | 1 |
| CPU | 1 | 0 | 0 |
| memory | 1 | 0 | 0 |
| hard disk | 1 | 1 | 0 |
| operating system | 1 | 1 | 1 |
| software | 1 | 1 | 0 |
| …… | …… | | |

|  | Computer | Intel | Microsoft |
|---|---|---|---|
| computer | 1.0 | 0.86 | 0.9 |
| CPU | 0.99 | 0.95 | 0.5 |
| memory | 0.95 | 0.5 | 0.4 |
| hard disk | 0.8 | 0.1 | 0.52 |
| operating system | 0.98 | 0.12 | 0.9 |
| software | 0.7 | 0.2 | 0.98 |
| …… | …… | | |

Figure 11B

SYSTEM, METHODS, AND DATA STRUCTURE FOR MACHINE-LEARNING OF CONTEXTUALIZED SYMBOLIC ASSOCIATIONS

CROSS REFERENCES TO RELATED APPLICATIONS

The present application claims priority to U.S. Provisional Patent Application 61/749,302 entitled "System, Methods, and Data Structure for Quantitative Assessment of Contextualized Symbolic Associations" filed on Jan. 5, 2013, and U.S. Provisional Patent Application 61/682,205 entitled "System and Methods for Determining Term Importance and Relevance Between Text Contents Using Conceptual Association Datasets" filed by the present inventor on Aug. 11, 2012, the disclosures of which are incorporated herein by reference.

BACKGROUND OF THE INVENTION

The present invention relates to natural language-based machine-learning, and includes non-natural language contents as well.

More specifically, the present invention relates to machine-learning technologies for identifying associations between terms or symbols in textual contents.

Conventional approaches in the field mainly focus on statistical methods and mostly with numerical data. Other approaches for machine-learning with textual data usually do not take the context information into consideration due to the difficulties in identifying the context in text contents, and the results of such approaches need to be improved.

Much of the information is contained in text contents, such as text documents or emails and other user-generated contents. Various theoretical and practical attempts have been made to efficiently understand, classify, and determine the amount and relevancy of the information in natural language contents. The existing techniques, including various search engines, spam filter, fraud-detectors, and document classification systems, however, are often not sufficiently accurate in understanding the content and the relationships between concepts that are contained in the text contents, thus often cannot effectively serve the information needs of their users. There is still a need for accurate, efficient, and automated technologies to identify, search, rank, and classify large amounts of natural language contents based on the meaning of the contents, and the amount of information they contain.

SUMMARY OF THE INVENTION

In a general aspect, the present invention relates to a method for quantitatively assessing associations between different terms in a natural language, where some of the terms represent an object or concept or topic, and some other terms represent the properties associated with the object or concept or topic.

In another general aspect, the present invention relates to methods for determining associations between symbols in non-natural language data contents.

The present disclosure makes references to U.S. patent application Ser. No. 12/631,829, entitled "System, Methods, and Data Structure for Quantitative Assessment of Symbolic Associations in Natural Language" filed by on Dec. 5, 2009. A summary of the referenced disclosure is first recited to serve as a basis for the new system and methods of the present invention. The drawings accompanying the referenced disclosure are also recited for ease of reference.

Methods of the present invention focus on assessing associations based on contextual information.

For the natural language contents, the methods include obtaining, by a computer system, a first group of text contents comprising one or more phrases or sentences or paragraphs or documents, at least some of which contain an object or concept name; determining a text unit type for processing; counting the occurrences of the text unit that contain the object or concept name, and counting the total number of text units in the group; identifying the contextual attributes of the object or concept name in the text unit, where the contextual attributes include grammatical and semantic and positional and distance attributes associated with the object or concept name; determining a weighting co-efficient based on the contextual attributes, and applying the weighting co-efficient in determining the association strength of terms in the text unit, and selecting terms based on the association strength as terms that are associated with the object or concept.

In yet another general aspect, the methods include obtaining, by a computer system, a second group of text contents comprising one or more phrases or sentences or paragraphs or documents, at least half of which are randomly selected or selected from a random source or a random source equivalent; determining a text unit type for processing; counting the occurrences of the text unit that contain a term that is not the same as the object or the concept name, counting the total number of text units in the group, and determining an external association strength based on the counts or the text unit type; further determining the object or concept-dependent association strength of a term based on its internal association strength and the corresponding external association strength.

In yet another general aspect, the methods include creating or storing or displaying a data structure representing the associative relationships between the terms and the object or concept. The data structure can be in multiple formats including a list format, or a table or matrix format, or an inverted index format, or a hierarchical structure or tree format.

For non-natural language contents, the methods include obtaining, by a computer system, a first group of data contents comprising one or more data units, at least some of which contain a target symbol associated with meanings or other attributes as a data selection criterion. The contextual attributes of the target symbol include semantic and positional and distance attributes associated with the target symbol. The methods further include determining a weighting co-efficient based on the contextual attributes, and applying the weighting co-efficient in determining the association strength of other symbols or terms in the data unit in relation to or under the context of the target symbol, and selecting symbols based on the association strength as symbols that are associated with the target symbol, or associated with the attribute as the selection criterion of the training data.

The present disclosure provides a linguistic-informational framework and implementation methods for creating data packages that store the knowledge about symbolic associations between an object and its potential properties with quantitative characterization of the strength of such associations.

An advantage of the present disclosure is that the disclosed systems and methods can greatly increase the machine-learning accuracy in quantifying associations among symbols or terms as compared to some conventional methods.

Another advantage of the present disclosure is that the disclosed systems and methods can significantly reduce both the computational and human labor cost in acquiring associative knowledge about the objects in the world by employing novel linguistic and informational analysis techniques.

The disclosed system and methods can significantly improve the accuracy and relevancy ranking for information searching and retrieval, and the accuracy for document classification, and can provide contextual information for sense disambiguation in natural language understanding, machine translation, and speech recognition.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIG. 5 illustrates a data structure with exemplified properties and their association strengths relative to the object "computer" recited from a referenced disclosure.

FIG. 9 shows an example of a multiple-column dataset adapted from FIG. 1 in accordance with the present invention.

FIGS. 11A and 11B illustrate the structure of a term-concept or term-topic matrix in accordance with the present invention.

DETAILED DESCRIPTION OF THE INVENTION

Human knowledge, or aspects of human knowledge, can be represented in various ways. While internal knowledge representations are functions of human brains, external or artificial representations such as Frame Representation and Semantic Networks are simulation models for certain aspects of such internal knowledge.

The present invention is based on a novel model developed by the present inventor for knowledge and linguistic information representation. The model, called Object Properties Association Model (OPAM), states that part of human knowledge is based on concepts about objects and their associated properties, or based on relationships between different objects. Certain objects are perceived as the properties of other objects. Certain objects are associated with other objects in ways that uniquely define the concepts of such other objects. Simply put, OPAM contends that an object can be uniquely defined by all its associated properties each of which carries a varying amount of information about the object.

Figure 1:
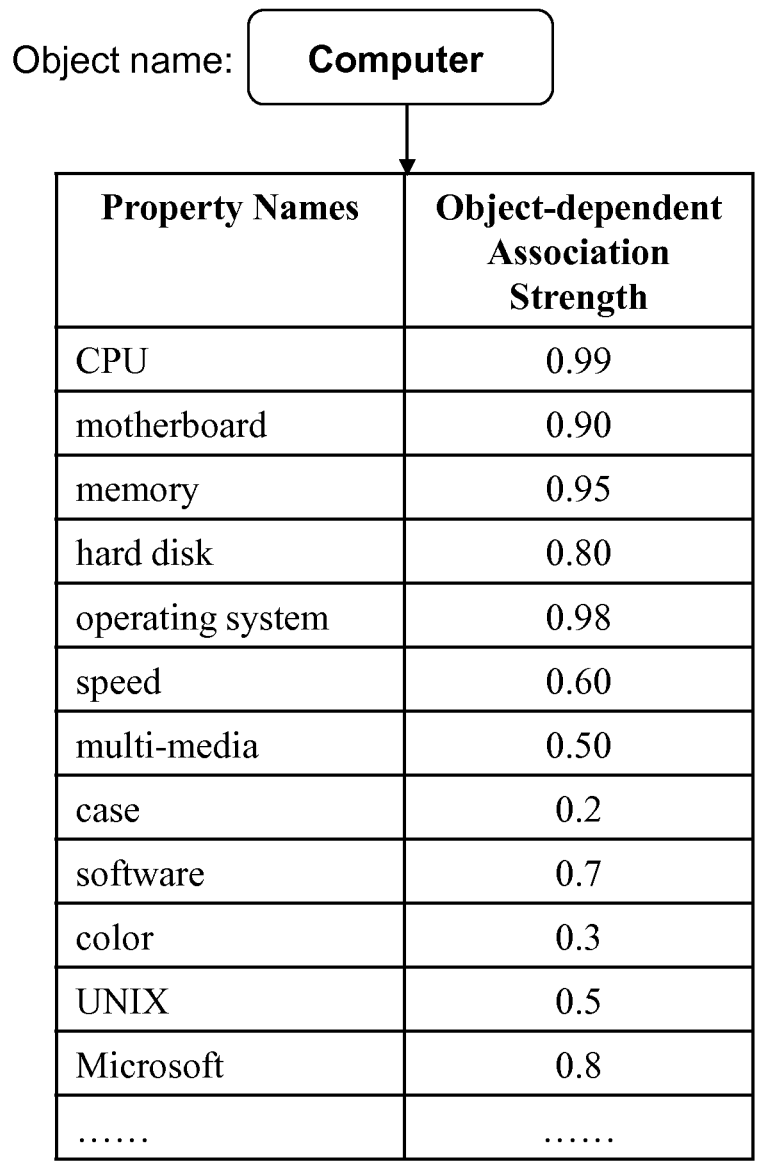
FIG. 1 illustrates an example of the object "computer", its defining properties and their association strengths associated with the object.

As an example, an object named "computer" is defined by the Merriam-Webster online dictionary as "one that computes; specifically: a programmable usually electronic device that can store, retrieve, and process data". However, the OPAM model of the present disclosure has a different approach to represent our knowledge about the object of "computer". Referring to FIG. 1, in the OPAM model, the object named "computer" is characterized by a plurality of associated properties such as "CPU", "motherboard", "memory", "hard disk", "operating system", "speed", "case", "software", etc., that are associated with the object "computer". The prominence of the association between "computer" and each of the properties is characterized by a numerical value herein called association strength. Hypothetical values for the association strengths for "CPU", "motherboard", "memory", "hard disk", "operating system", can for example respectively be 0.99, 0.90, 0.95, 0.80, and 0.98. A higher association strength value can represent a stronger association between the property and the object. The object "computer" can be uniquely defined by the associated properties and their respective association-strength values. Moreover, the association-strength value for a property is specific to the object, and usually varies for different objects. For example, the property "color" may have an association-strength value of 0.8 if the object is "flower", but an association-strength value of 0.2 if the object is "computer".

Conventional knowledge representation models such as the Frame Representation and Semantic Networks focus on the types of relationships between different objects and their derived relationships, such as a tree-like structure of parent-children relationships among different objects. The OPAM model of the present invention, in contrast, focuses on what properties are associated with a particular object and their association strength or defining power to the object. OPAM is not focused on the exact types of relationships between the properties and the object.

In OPAM, the object can be a physical object, or an abstract object such as a concept, and can be represented by a symbolic name in a language such as a word, a list of words or a phrase, a character string, a query, a sub-component of a query, a topic, or the name of a document category.

It should be noted that as the present disclosure involves natural languages, and makes references to certain grammatical terms such as a "sentence", and the "subject" and "predicate" of a sentence, and parts of speech of "object", the term "object" used in the present disclosure in the context of the Object Properties Association Model (OPAM) is different from the grammatical term of "object" that refers to the object of a transitive verb, such as a noun or a pronoun, which may be in the accusative case in certain languages, as is used when describing new methods using grammatical analysis with parts of speech. In the context of the Object Properties Association Model (OPAM), the sense of "object" used is a thing or a concept with a name.

Properties of an object can have varying degrees of prominence or association strengths to the object. While the properties are "defining features" of an object, the association strengths in OPAM specify that some properties are more "defining" than others. For example, the object of "computer" is associated with various properties such as having a CPU, memory, a case, a hard disk, as shown in FIG. 1. The property "CPU" having an association-strength of 0.99 is a more defining feature of the object "computer" than the property "case" that has an association-strength value of 0.2.

The OPAM also states that such object-properties relationships are contained in our everyday language. Corresponding to the grammatical structure, there is an information structure in the language we use. Take a simple declarative sentence for example. A simple declarative sentence consists of two parts, the subject and the predicate. In linguistics, a common understanding is that the subject is what the sentence is about, and the predicate tells something about the subject. In the following simple sentences:

1A "John is a student."
1B "John is intelligent."

"John" is the subject of the sentences, while "is a student" and "is intelligent" are respectively the predicates of 1A and 1B.

In the OPAM model, the predicate is interpreted as providing a piece of measurable information about the subject of the sentence. The OPAM model also states that human languages convey information in the basic form of stating that an object has certain properties, or an object is associated with certain other objects as being its properties. The general information structure for a simple declarative sentence is "Object O has or is associated with Property P", or O+P, corresponding to the grammatical structure of "Subject+Predicate", where the Subject is the name of an object, and the Predicate is a declaration that the object has (or is associated with) one or more properties. In the present disclosure, the use of "simple sentence" and "simple declarative sentence" is interchangeable.

The simple sentence 1A is a statement about two objects of "John" and "student". In a conventional understanding, the speaker is telling something about John (that he is a student). In a mathematical or logical interpretation, the object "John" is declared to be a member of the object class of students. In the presently disclosed OPAM, the object "John" is said to have or to be associated with a property of "being a student". The speaker is providing a piece of information about the object of "John". The simple sentence 1B associates another property with the object of "John" (that he is intelligent), thus providing another piece of information about the object of "John".

The same information structure in the simple sentences can also hold in complex sentences, as well as the grammatically distinguished compound sentences. A complex sentence is a sentence that contains other (embedded) sentences or clauses as its components. For example, in the complex sentence "I know that you are intelligent", the predicate "know that you are intelligent" contains another sentence of "you are intelligent", which has its own subject ("you" in this case) and predicate ("are intelligent"). Complex sentences, and simple sentences contained in them, can be recursively reduced to the atomic Subject+Predicate structure, corresponding to the basic information structure of Object+Property.

In conventional grammar, a compound sentence is a sentence that contains two or more independent clauses, or non-embedded clauses, such as "John is a student, and Mary is a teacher." in which the two clauses do not contain each other. For convenience, in the present disclosure, the term "complex sentence" refers to both the complex sentence and the compound sentence.

The subject or the predicate of a sentence can be in the form of a single word, a string of words or a phrase, or an embedded clause.

In linguistics, a phrase that consists of multiple words is often called a complex phrase, with an internal structure of "Modifiers+Head". For example, in the phrase "digital cameras", "digital" is the modifier, while "cameras" is the head. The order of the head vs. the modifiers in the phrase depends on the specific languages. In English, the head of a noun phrase may either be before or after the modifier. For example, in the phrase "the observed facts" and "the facts observed", the head noun of "facts" can be before or after the modifier. Under the OPAM model of the present invention, the informational structure of a complex phrase can also be represented by Object+Property, corresponding to the grammatical structure of the Head+Modifier. For example, in the phrase "digital camera", "digital" is interpreted as a property of the object of camera.

A document can include one or more paragraphs. Each paragraph can include one or more simple and/or complex sentences.

Given the information structure of a simple sentence as being "Object O is associated with Property P", the amount of information in a linguistic content may carry also depends on which properties of the object is being associated with the object. Compare the following:

2A. "A computer has a CPU."
2B. "A computer has a case."

Sentences 2A and 2B may not convey new information about the object of computer to someone having basic knowledge about computers. When asked: "Which of the sentences is more informative about the object of computer?" however, the same person would very likely choose 2A as the more informative one. This example shows that for the same object and to the same receiver of a message, different properties carry different amounts of information about the object. In this example, "CPU" is a more defining feature than "case" for the object "computer".

The sentence "A computer has a CPU and a hard disk." contains more information about the object "computer" than the sentence 2A. A document consists of two sentences such as "A computer has a CPU. And it also has a hard disk." contains more information about the object of "computer" than a document that consists of only one single sentence such as "A computer has a CPU." In OPAM of the present disclosure, this is stated as the cumulative or incremental nature of the amount of information in a linguistic content.

Figure 2:
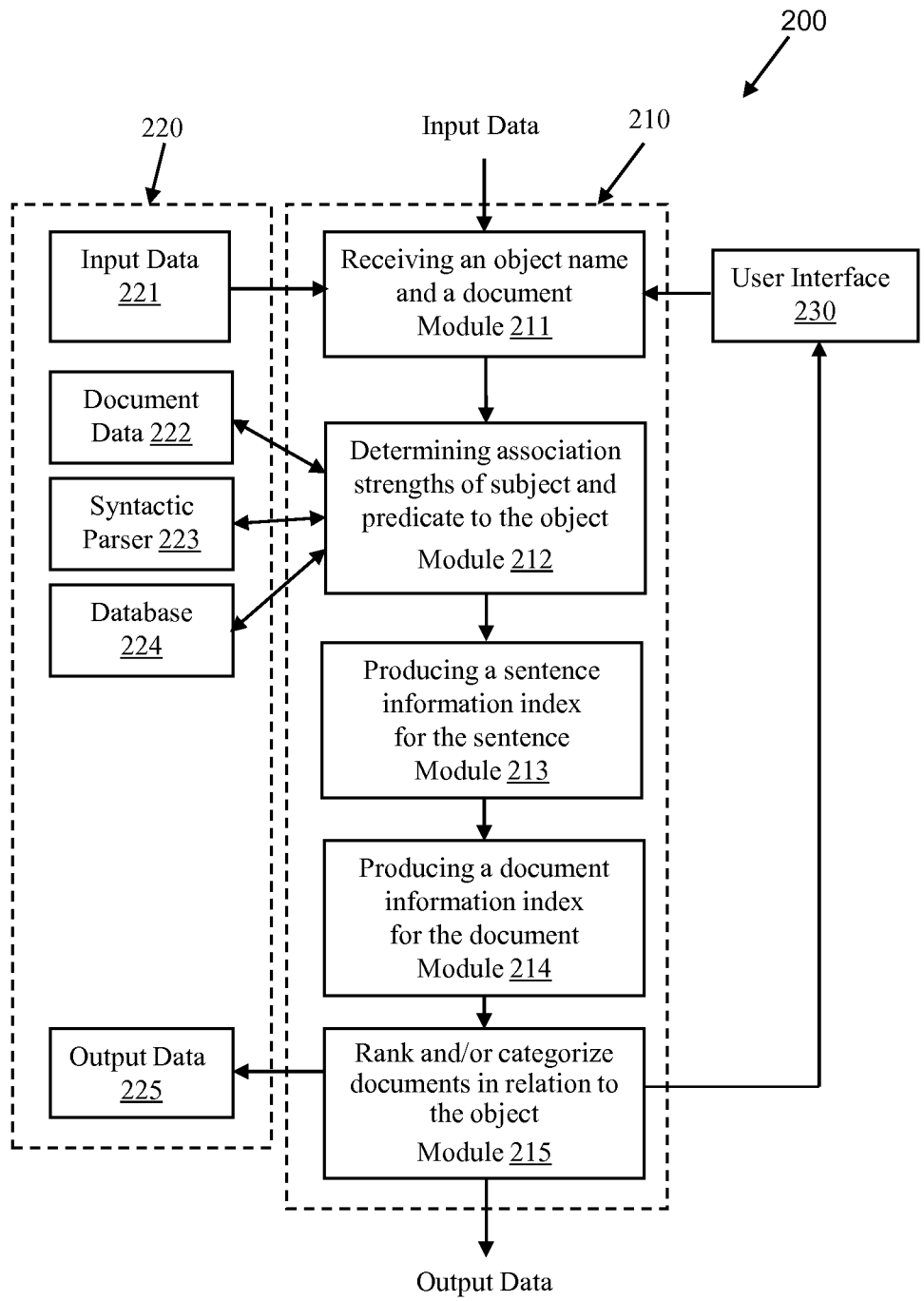
FIG. 2 is an exemplified system block diagram for quantitatively assessing information in natural language content in accordance with the present invention.

Referring to FIG. 2, a system 200 for quantitatively assessing information in natural language contents includes a computer processing system 210, a computer storage system 220, and a user interface 230. The computer processing system 210 includes algorithmic applications that further include functional modules 211-215 for conducting quantitative assessment of information in natural language contents. The computer processing system 210 can be implemented as, but not limited to, a central processing unit, an application-specific computer processor, a network server, and a group of computer processors. The computer processing system 210 can be implemented on a device that has computation power, for example, a personal computer, a portable computer, a mobile device such as a smart phone or a personal digital assistant, a computer network system comprising servers and processors that can provide information service to a remote server or client machine, and a cloud computing system. The computer storage system 220 can store, as described in more detail below, input data 221, document data 222 comprising one or more documents, optionally a syntactic parser 223, a database 224, and output data 225. The computer storage system 220 can be implemented in many types of storage media based on magnetic, optical, and mechanical properties, and nano materials, which can include a hard drive and an array of hard drives, flash memory, optical disks, and magnetic tapes. The user interface 230 can be provided, for example, by a program installed on a computer, a web browser, and an application for mobile devices.

The module 211 in the computer processing system 210 receives input data from an external source, input data 221 in the computer storage system 220, or the user interface 230. The input source can include a query from a web browser, a search text string entered by a user at a user interface (e.g. 230). The input data includes an object name and a document. The object name can be in the form of a word, a list of words or a phrase, a character string, a sub-component of such string. The object can be a physical object or an abstract object. The object name can be obtained from the input string, which can be or can contain a query, a topic, or the name of a document category. The document can be any type of documents that include text in a language, such as a web page, a menu, a book, an email, a text message, an article, a dictionary, an instruction manual, etc. The module 211 can first receive a path to one or more documents, and subsequently retrieves the one or more documents according to the path. The document(s) can be stored in document data 222 in the computer storage system 220.

The computer storage system 220 can optionally include a syntactic parser 223. A syntactic parser is in most cases a rule-based procedure, mostly embodied in the form of a computer program. It receives a string of characters, such as a sentence or an equivalent, and outputs a structural description of the grammatical relations between various components of the sentence. Syntactic parsers of various types can be freely or commercially available, or can be constructed based on rules one wishes to employ. The syntactic parser 223 can be used to divide a complex sentence into simple sentences, and then divide a simple sentence into a subject and a predicate. It can further divide a multi-word complex phrase into its components such as a head and its modifiers. As it is known, a syntactic parser may not always produce a structural description of a sentence that conforms to the understanding by human language users.

Details about systems and methods for quantitatively assessing information in natural language content is disclosed in U.S. patent application Ser. No. 12/573,134, titled "System and Methods for Quantitative Assessment of Information in Natural Language Contents", filed on Oct. 4, 2009, and Provisional Patent Application 61/143,140, titled "System and Methods for Quantitative Assessment of Information in Natural Language Contents" filed on Jan. 7, 2009, both by the first inventor of the present invention. The disclosures of these related applications are incorporated herein by reference.

The database 224 in the computer storage system 220 can store a plurality of object names, the names of properties for each object, and association-strength values of the properties for each object. The object names, the property names, and the association-strength values can be stored in a list or table form, as shown in FIG. 1, or in other data structures. The above described database can be called a Knowledge Base because it stores knowledge about associations among objects and properties. As discussed previously, the association strength for a property is dependent on the object of interest, thus the association strength can also be referred to as Object-Dependent Association Strength (ODAS).

The accuracy of information assessment, as well as the performance of other applications that utilize such association knowledge, is critically dependent on the quality of data stored in the database 224.

In U.S. patent application Ser. No. 12/631,829, entitled "System, Methods, and Data Structure for Quantitative Assessment of Symbolic Associations in Natural Language" filed by the first inventor of the present invention on Dec. 5, 2009, a system and methods are provided for the discovery or identification of the potential properties of an object through the information structure of natural language contents; and for the quantitative measurements of such "defining powers" for each of the properties of an object based on the linguistic-cognitive nature of such properties.

The following is a brief summary of the system and methods disclosed in this referenced disclosure, serving as a basis for the system and methods of the present invention.

In the referenced disclosure, the potential property terms of an object are identified from training data that are selected using novel selection methods based on the linguistic-informational structure of such data. As has been described above in the OPAM model, the basic information structure of a simple sentence is "Object+Properties", corresponding to the grammatical structure of "Subject+Predicate" of the sentence. The basic information structure of a complex phrase can also be represented by the "Object+Properties" structure, corresponding to the grammatical structure of "Head+Modifiers" of the phrase. Thus, if the target object name is the subject of a sentence, there is a high likelihood that the sentence contains at least one property term of the object, likely in the predicate of the sentence. Or if the subject of the sentence is a complex phrase and the target object name is somewhere in the phrase, or such a phrase is elsewhere in the sentence, there is a high likelihood that the phrase as well as the entire sentence contains at least one property term of the object. Training data selection methods are based on this unique principle. Conventional machine-learning methods, such as those related to feature selection for document classification, try to extract features from training documents that are selected based on the belief or human judgment that such documents are related to the target class, or based on the fact that the training data contain a specific word or phrase that represents the target class. Such methods are intuitive and obvious, but the quality and accuracy cannot be assured as such training data may often contain more irrelevant contents than what is related or truly relevant to the class. Compared with such intuitive methods that do not make reference to the internal linguistics and informational structure of the training data, the novel methods in the referenced disclosure can greatly enhance the quality of machine-learning results, particularly for the object-property association knowledge data, and minimize the noise in the training data.

Furthermore, in the referenced disclosure, the importance of a property to an object, or the "defining power" of a property is determined by two aspects of the property:

1) the degree of closeness of the property to the object, and
2) the degree of closeness of the property to everything that is not the object.

The following four sentences can be used to illustrate the above principle.

3A. "A computer has a CPU."
3B. "A computer has a parallel port."
3C. "A computer has a case."
3D. "A computer has a color."

"CPU", "parallel port", "case", "color" are all properties of the object of "computer", but it is apparent that they are of different degrees of importance or prominence or defining power for the object of "computer". In sentence 3A, the CPU is almost exclusively a component of the object "computer". "CPU" is a critical and indispensable part of every single computer, but it is almost never a component of something that is not considered a computing device. "CPU" thus has a high degree of closeness to the object of computer, but almost zero degree of closeness to what is not a computer.

In sentence 3B, the "parallel port" is also almost exclusively a component of the object of computer, but it is not a critical and indispensable part of every single computer, and almost nothing else that is not considered a computing device may also have it as a component. The term "parallel port" has a lesser degree of closeness to the object of computer, but almost zero degree of closeness to what is not the object.

In sentence 3C, although "a case" is a component of almost all computers, it is not a critical or indispensable component, nor exclusively a component of computers, but a common component of many objects that are not computers, such as a camera, a cell phone, etc. Presumably, it is of equal degree of closeness to computers and non-computers.

In sentence 3D, although having color is a property of all computers, not only it is not a critical and exclusive property of computers, but also it is a property of almost everything else, and more a property of more importance of many other objects that are not computers, such as flowers, paintings, etc. It is of a low degree of closeness to the object of computer, but a high degree of closeness to many other objects that are not computers.

In view of the above analysis, the importance of a property to an object can be determined by the property's degree of closeness to the object as well as its degree of closeness to all other objects. In the referenced disclosure, the two factors are quantified using novel linguistic-informational analysis techniques and computing methods that produce the numerical values to be stored in the database 224.

In the referenced disclosure, a property's closeness to the object is named as the "Internal Association Strength" (IAS). A property's closeness to everything that is not the object is named as the "External Association Strength" (EAS). Since the same-named property can have different association strength values to different objects, such as the property of "color" to the object of "computer" as compared with the object of "flower", the measurement of the association strength of a property is object-dependent. Thus, the overall importance of such a property is named the "Object-Dependent Association Strength" (ODAS), which represents the property's net association strength to a specific object.

Figure 3:
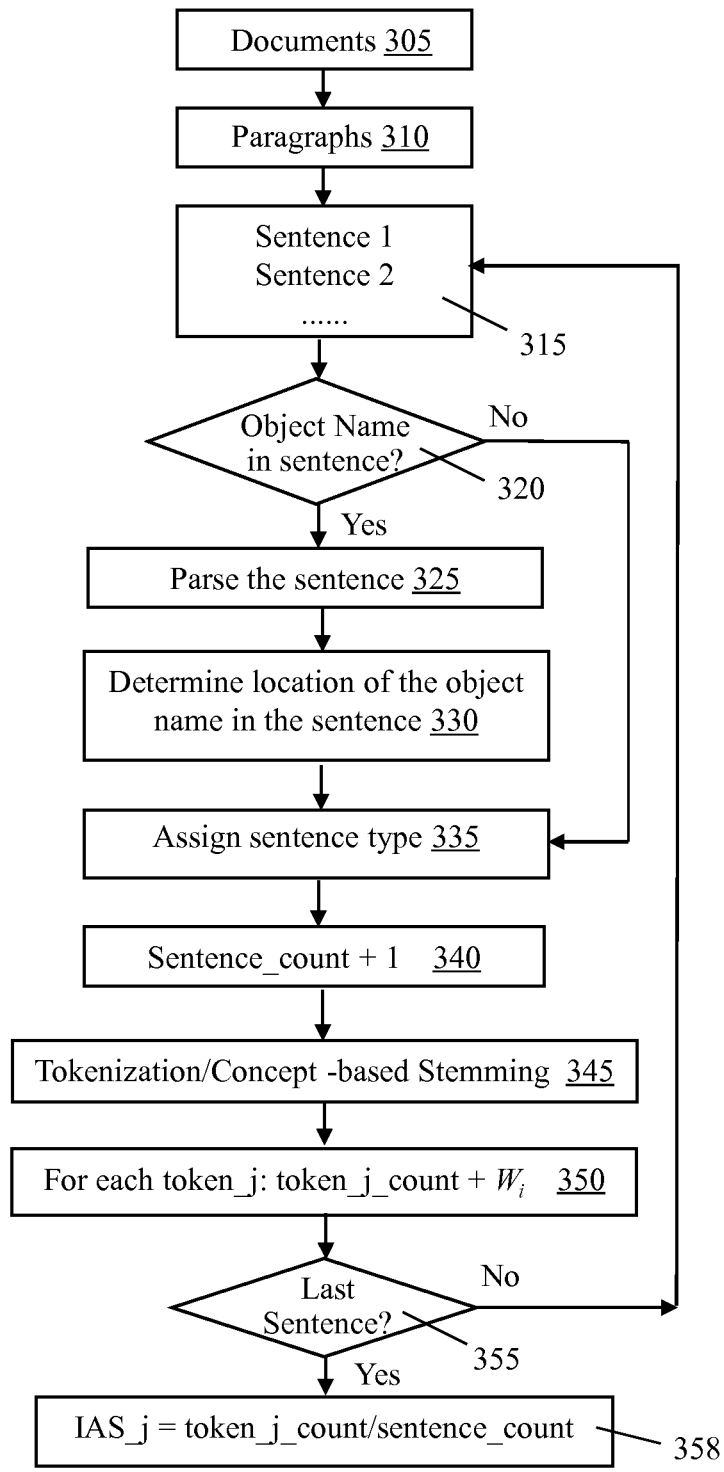
FIG. 3 is an exemplified flow diagram for obtaining the values of internal association strengths recited from a referenced disclosure.

FIG. 3 repeated here from the referenced disclosure illustrates an exemplified process for computing internal association strengths of properties relative to an object. A first group of documents are used to compute internal association strengths (step 305). These documents can be obtained from any available written materials, such as newspapers, books, dictionaries, or electronic files, emails, user comments on social network or from mobile devices, web pages, instant messages, etc. The documents in the first group can be any units of text such as sentences or paragraphs or documents or multiple documents that either include the object name or contain information about the object, or are obtained from contents that contain the object name or are related to the object. In one embodiment, the first group can include a few thousand or more of such documents. In general, the accuracy of computation can be improved by using as many text units from as many diverse sources as available and feasible, and at least half of the text units should contain at least one occurrence of the object name, and at least half of the text units should contain at least one occurrence of a potential property name that is different from the object name. Each document is separated into one or more paragraphs (step 310). Each paragraph is separated into one or more sentences such as sentence 1, sentence 2, etc. Optionally, complex sentences are broken down into simple sentences (step 315), and complex phrases are broken into sub-components, such as a head or a modifier, or just a sub-component of the phrase. For illustrative purposes, the following examples are mainly based on simple sentences; certain steps are optional in actual implementation, but are included for ease of illustration.

A sentence in the one or more sentences is then selected and checked if the sentence includes the object name or not (step 320). If not, the sentence is assigned to a special Sentence Type in step 335 as discussed below. If yes, the sentence is parsed by a syntactic parser to identify components of the sentence such as the subject, the predicate, and detailed structures within the subject, the predicate, or other parts of the sentence (step 325). For a multi-word phrase, the parsing operation can identify the head and the modifier of the phrase.

The location of the object name in the sentence is next determined based on the parsing results (step 330), and a Sentence Type is assigned to the sentence according to the location of the object name in the sentence (step 335). An exemplified Sentence Type definition can include the following:

If the object name matches the subject, the sentence is marked as a Type 1 sentence. This type of sentence is most likely to include at least one property name with high defining power to the object.

If the subject is a multi-word phrase and the object name is the head of the multi-word phrase, the sentence is marked as a Type 2 sentence.

If the subject is a multi-word phrase and the object name is a modifier in the multi-word phrase, the sentence is marked as a Type 3 sentence.

If the object name matches the predicate of the sentence, the sentence is marked as a Type 4 sentence.

If the predicate contains a sub-phrase and the object name is the head of the sub-phrase, the sentence is marked as a Type 5 sentence.

If the predicate contains a multi-word phrase and the object name is a modifier in the multi-word phrase, the sentence is assigned as Type 6.

If the object name is in any other text in the sentence, the sentence is marked as a Type 7 sentence.

If the sentence does not contain the object name (step 320), as a follow up to a negative answer to the question in the step 320, the sentence bypasses the parsing process in step 325 and step 330, and is marked as a Type 8 sentence. Although this type of sentences do not contain the object name, words and phrases (as potential property names) in this type of sentences may still carry some relevance (albeit not as strong as the other sentence types) to the object name because the paragraph or document such sentences are extracted from has been determined to be related to the object name.

As discussed above in relation to OPAM, different types of sentences may have different degrees of likelihood of containing property names with different degrees of defining power as a result of object name being in different locations in the sentences.

A parameter "sentence_count" is next incremented by 1 (step 340). The parameter "sentence_count" tracks the total number of sentences that passes the step 320, each of which may include potential property terms associated with the object name.

Next, different words and/or phrases in the sentence are extracted as tokens or token instances of terms that can be potential property names (step 345). In some cases, the use of a parser for the purpose of tokenization is optional. When a parser is not used for the tokenization of the sentence, other methods such as single-word tokens or multi-word n-gram methods can be used.

Depending on the specific language being processed, a process called stemming may be employed. This usually applies to Western languages, such as English and other members of the Indo-European language family, but not always applicable in many of the Eastern languages. When it applies, as an optional step, the presently disclosed methods provide a novel approach of concept-based stemming in the tokenization of the sentences in the training data. The concept-based stemming merges only those words that are morphological variations of the names of the same concept or object name, for example, the plural form of a noun with the singular form of the same noun in English. In English, certain morphological variations of verbs, such as those for tense and aspects (e.g. "go", "went", and "gone") have their own shades of meaning and can carry very different meanings, and thus are not recommended for stemming. Variations for subject-verb agreement, such as "go" vs. "goes", are recommended for merging since they are referring to the same concept of an action. One aspect of the presently disclosed methods is that different rules of morphological consolidation can be used for specific languages. This concept-based stemming method is different from common practices in the conventional document retrieval or classification.

In some aspects, the so-called "stop words" can be included in the presently disclosed methods. Some words that are treated as "stop words" in conventional techniques are considered here to be also meaning-carrying units in the language, which may be part of the names of potential properties of certain objects. For example, "the" and "a" in English are conventionally excluded from text analysis as non-meaning-carrying words. However, phrases such as "a house" and "the house" can be very different in meaning under different contexts. In a legal document about the ownership of a house, a sentence "He owns a house" can have a very different consequence from the sentence "He owns the house". Since the present system and methods involve the meanings of natural languages, such conventional "stop word" can be included for identifying property names.

Each word or a phrase extracted from the training data is called a token or a token instance of a term. For example, the word "camera" is a term, and each occurrence of the word "camera" in a document can be called a token or a token instance of the term "camera". In the following description, the word "term" and "token" are sometimes used interchangeably, especially when the difference between the two is not important, or can be ignored.

For a jth token of a term, a parameter "token_j_count" is incremented by a weighting coefficient, $W_j$, which depends on the Sentence Type, i, for each sentence of type i that includes the jth token (step 350). The weighting coefficient, $W_i$, can have an exemplar value between 0 and 1, the magnitude of which reflects the different degrees of likelihood for potential property names in different sentence types. Using the example of Sentence Type definition described above, $W_1$ (for a Type 1 sentence) may be assigned a value of 1 because a term in a Type 1 sentence is more likely to be a high-valued property name than in other types of sentences. Thus, for each Type 1 sentence that includes the jth token, "token_j_count" is incremented by 1. Similarly, values of other weighting coefficients can be exemplarily set as $W_2=0.9$; $W_3=0.8$; $W_4=0.7$; $W_5=0.6$; $W_6=0.5$; $W_7=0.4$; $W_8=0.3$ for the corresponding types of sentences in accordance with the decreased likelihood that a token may be a high-valued property name in the corresponding sentence types. In general, the contributions to "token_j_count" by these types of sentences are their respective weighting coefficients, and it is mathematically equivalent to their respective counts of sentences that include the jth token being scaled by their respective weighting coefficients.

Steps 315 to 350 are to be repeated until all the sentences in the paragraphs and the documents that meet the selection criteria are finished (step 355). The internal association strength "$IAS_j$" for the term having the jth token can be the cumulative "token_j_count", or further divided by "sentence_count" that is the total number of the sentences selected as the training data (step 358). In some embodiments, the parameter "sentence_count" can be a number that is at least half of the total number of sentences in the training data. $IAS_j$ can have a value between zero and one depending on the value of the weighting co-efficient. The most relevant property names can be obtained by selecting terms that have IAS values higher than a predetermined threshold.

It should be noted that Sentence Type definition can include different variations, and the weight coefficient W can be assigned different values.

In some embodiments, a single type of sentences, such as type 1, or a mix of a selected number of sentence types can be used as the training data. One exemplar case for such a choice is when a large number of high-quality sentence types are available, so only the high-quality sentence types, such as type 1 or type 2 sentences are used; or when a high precision of the association data is required, thus only the high-quality sentence types should be used. Similarly, the number of sentences selected as the training data can be a portion of the total sentences from the first group of documents in step 305, and the "sentence_count" can be adjusted accordingly.

In some embodiments, when the parser is not used, the steps of identifying sentence types or assigning weighting co-efficient based on the grammatical attributes can be skipped.

As has been described earlier in relation to OPAM, one of the principles in the present disclosure is that the importance of a property to an object, or the "defining power" of a property can also be determined by two aspects of the property:

1) the degree of closeness of the property to the object, which is the internal association strength as described above; and 2) the degree of closeness of the property to everything that is not the object, which is the external association strength described below.

Figure 4:
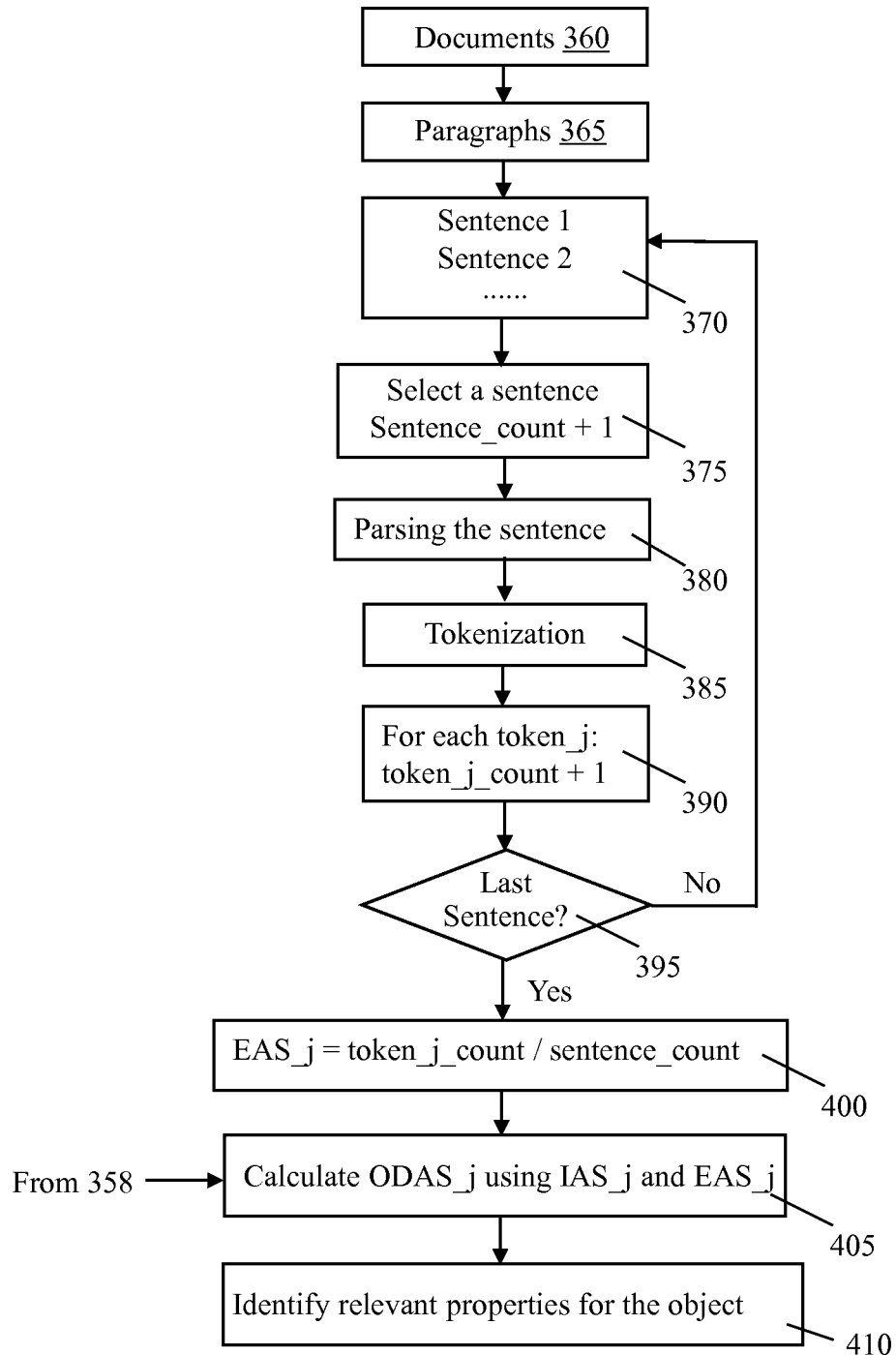
FIG. 4 is an exemplified flow diagram for obtaining the values of object-dependent, internal, and external association strengths recited from a referenced disclosure.

In some embodiments, referring to FIG. 4, a second group of documents are used as training data to obtain the external association strength of the potential property terms of an object. These documents usually do not contain the object name or are determined not to be about or not to be related to the object even they may contain the object name (step 360). The data amount (the numbers of documents, paragraphs, and sentences) in the second group is usually more than the data amount in the first group of documents because there is typically a lot more information not related to an object than there is information related to an object. An important aspect of this method is to select training data from random sources, or from random source equivalents, such as selecting a large enough number of documents from a large enough number of sources that are of different topics or classes or categories. For example, to be statistically valid or equivalent to a random selection, one way is to select training documents from at least ten or twenty different topics or classes or categories. In general, at least half of the text units used should be from a random source or an equivalent to a random source, or at least not from a predefined or specified content class or category, and at least half of the text units should contain at least one occurrence of a term that is to different from the object name. The documents are separated into paragraphs (step 365) and sentences (step 370).

The "sentence_count" is incremented by one for each sentence in the document group (step 375). The sentences each is then optionally parsed to identify its grammatical components such as the subject and predicate and other phrases (step 380). The use of a parser is preferred, but not required, for the purpose of identifying well-formed phrases for use in the tokenization process later. If a parser is used for the tokenization of the internal association training data (step 325), to avoid inconsistency, a parser should also be used for the tokenization of the external association training data. When a parser is not used, other methods of tokenization, including the single-word tokens or n-gram method can be used. Optionally, concept-based stemming process as described above is used. Since the second group of documents do not include the object name, no sentence type and weighting coefficients are required.

If the sentence includes a jth token, "token_j_count" is incremented by one (step 390). Steps 370 to 390 are repeated until the last sentence in the second group of the documents (step 395). The external association strength for the jth token is calculated (step 400) by the cumulative token count for the jth token "token_j_count" in the second group of documents divided by the cumulative sentence count "sentence_count" in the second group of documents. In some embodiments, the parameter "sentence_count" can be a number that is at least half of the total number of sentences in the second group. EAS, can a value between 0 and 1 or beyond in this case.

In some embodiments, the number of sentences selected as the training data can be a portion of the total sentences from the second group of documents in step 360, and the "sentence_count" can be adjusted accordingly.

Finally, an object-dependent association strength (ODAS) for the jth token as a property name can be calculated (step 405) using the $IAS_j$ obtained in step 358 (FIG. 3) and the $EAS_j$ obtained at the step 400.

In some embodiments, $ODAS_j$ for a jth property is computed by the following equation:

$$ODAS_j = IAS_h - EAS_j. \quad (Eqn. 1)$$

Using this method, the ODAS value for a token or a property name can be in a range between −1 and 1. It should be noted that although an ODAS value can be −1 for a property, which means that the property is never associated with the object in the training data, but associated with the non-object-related data 100% of the time, in reality, however; when the training data for the external association is in a large enough quantity and truly from random sources, most of the negative ODAS values tend to be slightly below zero. Thus, in some embodiments, negative ODAS values can be assigned to zero so that ODAS always has a value range between 0 and 1.

In some other embodiments, the object-dependent association strength can be calculated using different formulae from the above, for example, using a formula:

$$ODAS_j = IAS_j * (IAS_j/(IAS_j + EAS_j)) \quad (Eqn. 2)$$

One beneficial feature of the formula in Eqn. (2) is that ODAS does not have negative values. This can be understood in the following example: for the object of "computer", the property of "has a color" may have a stronger external association than internal association, thus having a negative ODAS value based on Eqn. (1). From the cognitive point of view, however, a color is still a property of the object of "computer", even though it is not an important property. In such cases, a small positive ODAS value from Eqn. (2) can be cognitively more reasonable and convenient than a negative value.

It should be noted that the use of IAS, EAS, and ODAS in the present disclosure is different from feature selection for document classification in some conventional classification systems. The conventional classification systems are mainly based on pure mathematical approaches, such as Information Gain, Mutual Information, etc., rather than based on the linguistic and cognitive approach as described in the present disclosure. And the features selected by the conventional methods are for classification only, rather than for the quantitative measurement of association strengths of properties related to an object as described in the present disclosure.

The examples illustrated above are mainly based on sentences as a text unit. In some embodiments, the text unit for identifying property names and computing IAS, EAS, and ODAS can be paragraphs or documents instead of sentences. Paragraphs as text units can be viewed as a special case of treating documents as text units.

For example, when paragraphs are used as the text unit for IAS, the paragraphs can each contain at least one incidence of the object name. A paragraph or its content can be assigned a paragraph type number, k, with a corresponding weighting coefficient value $W_k$, depending on what type of sentences as defined above (in step 335) the paragraph contains, such as whether the object name is in the subject or the predicate of the sentence, and/or how many of such sentences the paragraph contains, and/or how many occurrences of the object name the paragraph contains. A parameter "paragraph count" is incremented by 1 for each paragraph selected as training data. A parameter "token_j_count" is incremented by the value of the weighting coefficient $W_k$ when a paragraph contains at least one occurrence of the jth token. IAS can be calculated by dividing the cumulative "token_j_count" by the cumulative "paragraph count". In calculating the EAS, paragraphs can be selected from the second group of documents that do not contain the object name based on the same principle in selecting sentences from the second group as described above. "token_j_count" is incremented by 1 for each paragraph that contains at least one occurrence of the jth token. The EAS for the jth token can be calculated by the cumulative token count for the jth token "token_j_count" in the second group of documents divided by the cumulative paragraph count "paragraph count" in the second group of documents. The final ODAS value for the jth token can be obtained from either Equation (1) or Equation (2). The same methods apply when the text units of training data are documents instead of paragraphs.

In some embodiments, the text unit can also be phrases that contain at least two words, with one being the head and another being a modifier of the head, or both being a sub-component of the phrase without distinguishing the roles of head or modifier. In some embodiments, the text unit can be a portion of a sentence.

In some other embodiments, the text unit can also be a collection of multiple documents. In some cases, the multiple documents can be merged into one single document for processing with the methods described above.

In some embodiments, the IAS or the EAS or the ODAS score value can be adjusted based on whether the text unit used in the process is or contains a phrase or an incomplete sentence, or a sentence, or a paragraph, or a document, or a document collection of multiple documents. A weighting co-efficient can be used to adjust the score value.

In some embodiments, the external association strength (EAS) value for a plurality of terms can be first obtained using the steps described above, and can be stored in the database, and retrieved for use when identifying the association data for different objects or concepts, without repeating the process as illustrated in FIG. 4 above. In some embodiments, such external association strength data can be stored alone, or in combination with the internal association data of a specific object or concept.

FIG. 5 illustrates an exemplified data structure for the association strengths for the object of "computer", which can be stored in the database 224. Values for association strengths (ODAS, IAS, and EAS) are listed for each property such as "CPU", "Motherboard", "Memory" . . . etc. For the property name "CPU", IAS is exemplarily 0.99, and EAS is exemplarily 0.0, which means CPU occurs in most of the sentences or documents about the object "computer", but almost never occurs in context that does not include the object name of "computer". ODAS is thus 0.99 (0.99–0.0). For the property name "speed", although it occurs frequently in sentences or documents about "computer" with an IAS of 0.7, it is also frequently used in other context, giving an EAS of 0.1. The property name "speed" thus has an ODAS of 0.6 (0.70–0.1).

The presently disclosed methods and system can produce data packages for object names and their associated data structures for association strength values of a very large number of properties. A list of property names is stored for each object name. In some embodiments only a subset of such properties are needed, such as those that are considered to be more relevant or the more defining properties of the object than others. Relevant property names can be selected if their ODAS values are above a threshold value (step 410, FIG. 3). For example, a threshold value for ODAS can be 0.001. Property names that have ODAS values below the threshold can be viewed as irrelevant to the object and can be discarded. Each data package for a property name stores three association values of ODAS, IAS, and EAS as exemplified in FIG. 5.

Figure 6:
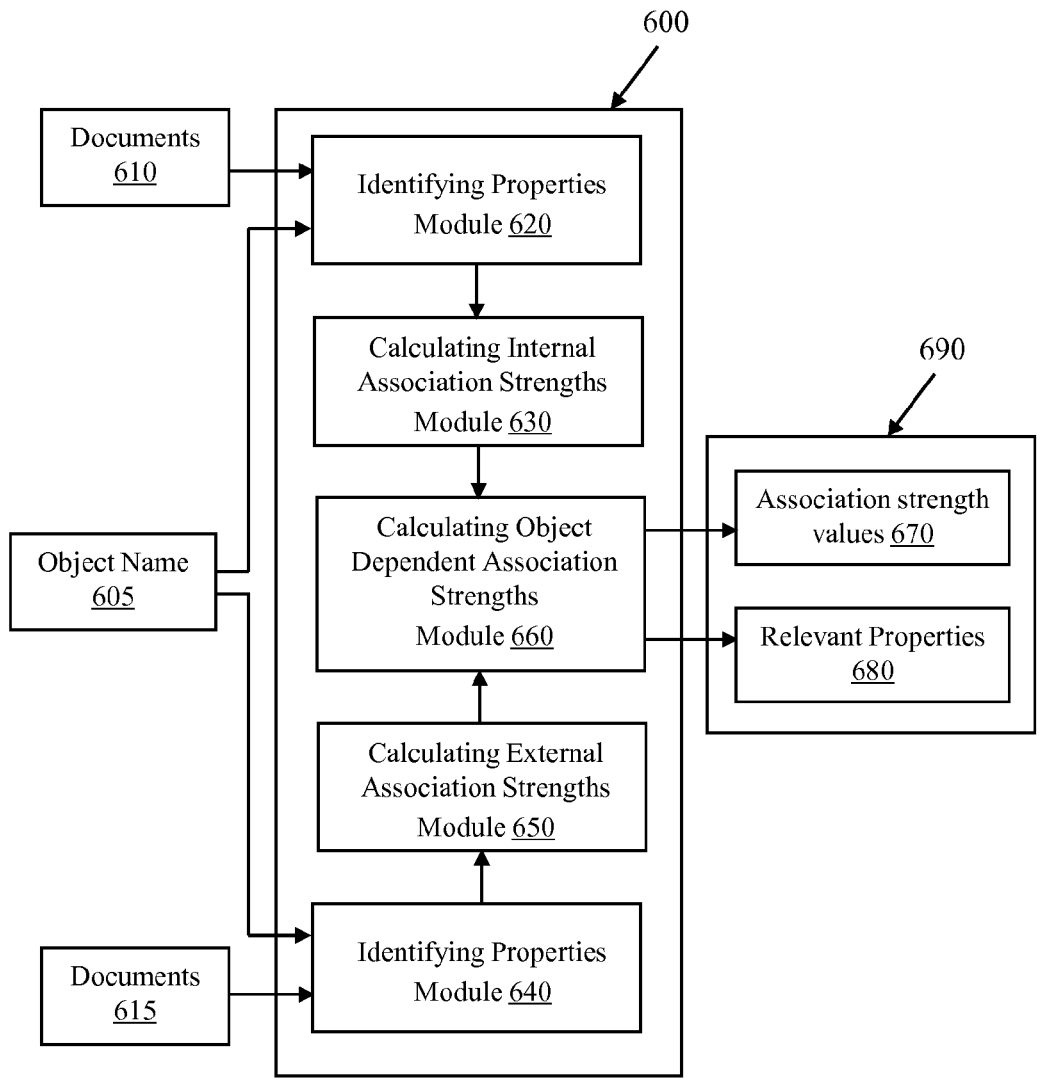
FIG. 6 is an exemplified system diagram for identifying property names for an object and for computing association strengths for the properties related to the object recited from a referenced disclosure.

FIG. 6 illustrates a computer system 600 for identifying properties for an object and for computing association strengths for the properties related to the object. The computer system 600 is suitable for conducting the processes illustrated in FIG. 3 and FIG. 4. The computer system 600 includes a module 620 configured to receive an object name 605 and a first group of documents 610 that contain information about the object. In some embodiments, the module 620 can also identify and select documents in the first group of documents 610 that contain information about the object among a large number of documents. The module 620 is configured to identify potential property names related to the object in the first group of documents (as shown, for example, in steps 320-350 in FIG. 3). A module 630 is configured to calculate values of internal association strengths for the potential properties. The computer system 600 also includes a module 640 configured to receive the object name 605 and a second group of documents 615 that are not about the object. The module 640 is configured to identify potential property names in the second group of documents (as shown, for example, in steps 375-395 in FIG. 3). A module 650 is configured to calculate values of external association strengths for the potential properties identified by the module 640. A module 660 is configured to compute object-dependent association strength using the values of internal association strengths from module 630 and the values of external association strengths obtained by the module 650. The computer system 600 can output association strength values 670 for IAS, EAS, and ODAS to be stored in a knowledge module 690. The computer system 600 can also select a list of relevant properties 680 by filtering IAS and EAS with predetermined range criteria (thresholds, upper bounds, etc.) (as described in step 410), and output the list of relevant properties 680 to be stored in the knowledge module 690. The knowledge module 690 can be stored as the database 224 (FIG. 2).

The above described data package can be used as a standalone portable knowledge module that can be flexibly utilized in various systems or applications. In document classification, for example, such data packages can be used as pre-trained feature vectors for specific classes in various classifier instances or document repositories. Such data packages can also be used as portable pre-trained knowledge modules in various intelligent systems for content or topic recognition and object detection, document relevance ranking, ambiguity resolution for word senses, and other natural language processing applications.

Another novel aspect of the above described data packages is that it provides additional knowledge data of both the internal and external association strength values. Such a novel and unique data structure and content can allow intelligent systems to more accurately adjust system sensitivity for feature detection to meet specific requirements of the tasks, and enhance the performance by making selective use of the data content.

For example, "recall" and "precision" are two common performance measures in information retrieval and document classification. In certain situations, a higher recall rate may be more desired than precision, such as when there are only a small number of documents that are potentially relevant to the query, or when there is a need to examine all potentially related documents in the repository no matter how many such documents are there in the repository. With the novel data contents and structure of the present invention, when they are used for document retrieval, recall can be emphasized by selecting a subset of the properties of which the internal association strength values are above a medium or low threshold, and the external association strength are below a medium-valued upper bound. For example, a threshold value of 0.01 for the internal association strength, and an upper bound value of 0.01 for the external association strength. The customized value ranges for the IAS and EAS can help retrieve, classify, or rank more potentially relevant documents.

In some other situations, a higher precision is more desired than recall rate. For example, when there are a huge number of potentially relevant documents in the repository, it is often unnecessary and uneconomical to examine an overwhelmingly large number of documents. With the presently disclosed novel data contents and structure, when used for document retrieval, precision can be emphasized more than recall by selecting a subset of the properties of which the internal association strength values are above a medium or high threshold, and the external association strength values are below a low-valued upper bound: for example, a threshold value of 0.35 for the internal association strength, and an upper bound of 0.005 for the external association strength. The customized value ranges for the IAS and EAS can help more precisely retrieve, classify, or rank documents.

Figure 7:
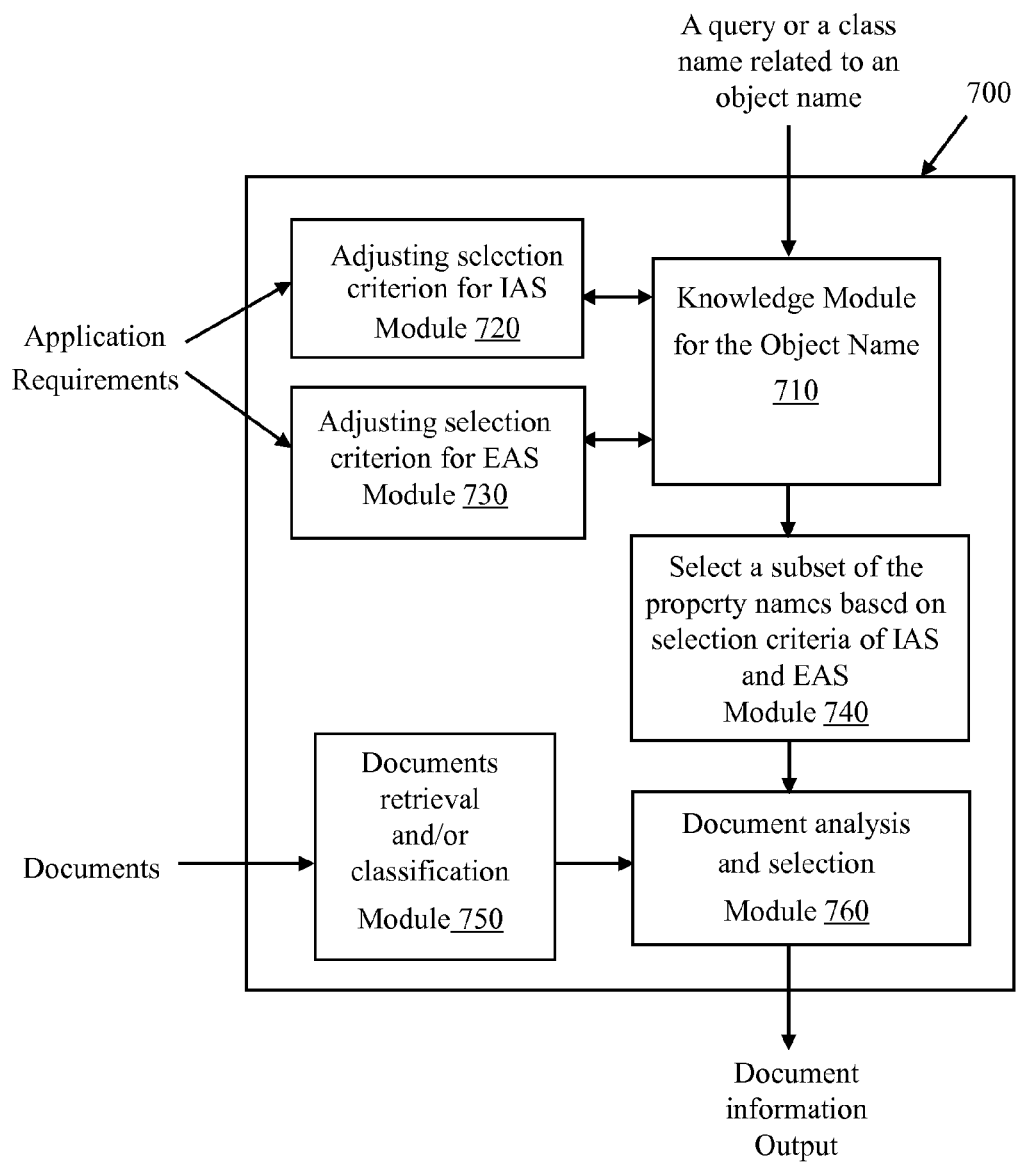
FIG. 7 is an exemplified system diagram for an intelligent information retrieval and document classification system capable of adjusting the system sensitivity for different applications using the disclosed data packages recited from a referenced disclosure.

FIG. 7 shows an intelligent information retrieval or document classification system 700 that is capable of flexibly adjusting system sensitivity for different applications using the disclosed data packages. The system 700 receives an object name (as a query or a class name) and documents to be analyzed. The system 700 retrieves a knowledge module 710 related to the object name. The knowledge module 710 includes data packages that include IAS, EAS, and ODAS values for a plurality of property names related to the object name, as described above. The system 700 also receives application requirements for retrieving the information or classifying the documents. For example, some applications may require, as described above, that a higher recall rate is more desired than precision. Some applications may require that a higher precision is more desired than recall. A module 720 can adjust the IAS threshold value to select a subset of the property names in accordance with the application requirements. Another module 730 can adjust the range for the EAS value to select another subset of the property names in accordance with the application requirements. For example, as described above, the IAS threshold can be set at or below 0.01; and the EAS value can be set at or above 0.01 if a higher recall rate is more desired than the precision. A module 740 can select a subset of property names in the knowledge module for the object name that are above the IAS threshold but below the EAS upper bound. The documents are retrieved into the system 700 by a module 750. A module 760 is configured to analyze the documents retrieved by the module 750 using the selected property names by the module 740. The documents are then selected, classified, or ranked etc. by module 760. The result is output by system 700.

The above is a summary of the referenced disclosure in U.S. patent application Ser. No. 12/631,829, entitled "System, Methods, and Data Structure for Quantitative Assessment of Symbolic Associations in Natural Language" filed by the first inventor of the present invention on Dec. 5, 2009, recited here to serve as a basis for the new system and methods of the present invention.

Additional Embodiments for Determining Associations Between Terms or Concepts or Symbolic Elements The system and methods recited above in the referenced disclosure can be further extended to provide more methods for determining the associations between terms or concepts contained in natural language contents, and also in other types of data contents containing meaning-carrying symbols, such as contents containing numerical data like various database records, or other types of data objects.

As is described above in the referenced disclosure, the word "object" can refer to either a physical object, or a mental object such as a concept, idea, etc. In the present disclosure, this can also refer to other objects such as a topic or an attribute, as will be described in more details later. In the present disclosure, the word "object" and "concept" and "topic" or "attribute" can be interchangeably used for determining the association.

In the system and methods recited above in the referenced disclosure, the use of the grammatical roles of subject and predicate or modifier or head of a complex phrase, etc., is based on the principle that meanings or information carried in languages are often determined by the context. The subject of a sentence provides the context for determining the meaning or relationships of the words or phrase in the predicate of the sentence, or vice versa; and the head of a phrase provides a context for determining the meaning or relationships of the modifier, and vice versa, and such context information helps to identify the property terms associated with an object or a concept. Furthermore, the association strength obtained from external data also provides a type of context for determining the associations between the object and its properties. In the present disclosure, more methods for the use of context information are disclosed.

Figure 8:
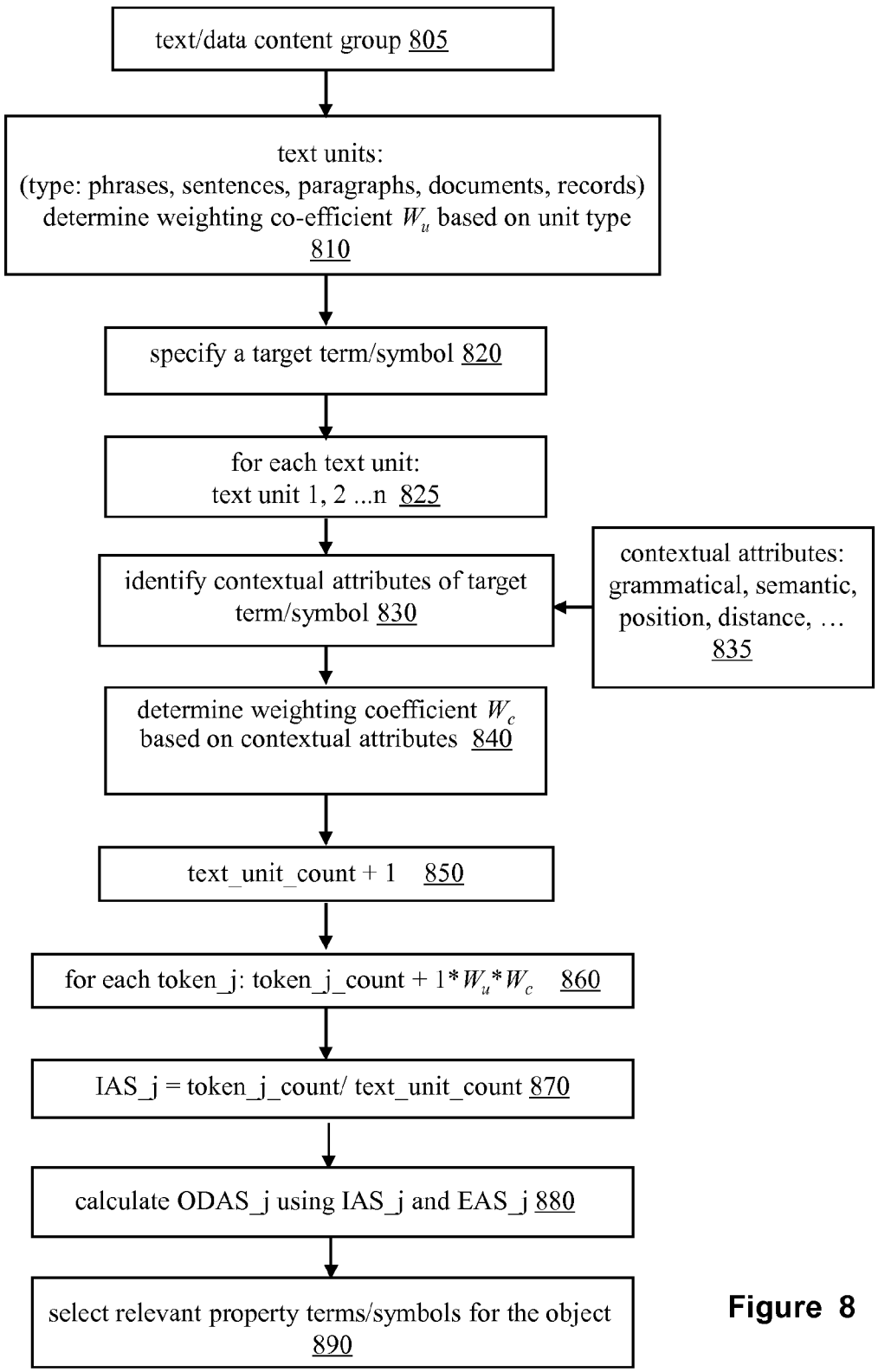
FIG. 8 illustrates exemplar steps of determining the association strength of terms in a group of text contents based on the contextual information in accordance with the present invention.

FIG. 8 illustrates exemplar steps of determining the association strength of terms or symbols in a group of text or data contents based on certain exemplar contextual information. For ease of illustration, the following description mainly uses text contents from a natural language as examples. In FIG. 8, a group of text contents (805) are first obtained as training data. The text contents either contain a target term or symbol, such as the object or concept name, or have an attribute as a criterion for selecting the text contents, such as documents that are considered to be of a similar topic or class of category, or documents that are considered as spam emails, etc. Then, a text unit for processing is determined. A unit type can be assigned based on whether the text unit is or contains a phrase containing more than one word, or an incomplete sentence, or a sentence, or paragraph, or a document, or even multiple documents; and a weighting co-efficient $W_u$ can be determined based on the unit type (810). Then, a target term or symbol is specified. This can be the object or concept name, or some other data name or value (820). Then, each text unit is processed (825). First, the contextual attributes of the target term or symbol is identified (830). The contextual attribute of a term or symbol can include its grammatical attributes, semantic attributes, or positional attributes, etc. (835), as will be described in more details below. Then, another weighting co-efficient $W_c$ can be determined based on the contextual attributes of the target term or symbol (840). The total number of text units in the group of text content is incremented by one for each text unit processed (850). For each token instance of a j-th term (word or phrase) in the text unit, a parameter token_j_count is incremented by one, and can be multiplied by the weighting co-efficient $W_u$ and $W_c$ to reflect the effect of the contextual attributes as well as the type of the text unit on the strength of the term being associated with the target term or symbol or attribute (860). In some embodiments, an additional weighting co-efficient can be used based on whether the target term/symbol and the token instance of a j-th term are in the same phrase or in the same sentence, etc. A parameter known in the referenced disclosure as Internal Association Strength (IAS) can be obtained by the token_j_count alone, or by dividing the token_j_count by the total number of the text units processed in the data group (870). Also as illustrated in FIGS. 3 and 4 of the recited referenced disclosure, external association strength (EAS) can be obtained using another data set from external sources, and a modified Object-Dependent Association Strength value (ODAS) can be obtained by using the internal association strength and the external association strength (880). Finally, terms or symbols can be selected based on the ODAS value as being associated with the object or concept or attribute (890). Depending on the implementation, some steps can be optional.

In some embodiments, in addition to the grammatical roles such as the subject, predicate, modifier, head, etc., the grammatical attributes of a term further includes the parts of speech of a term whether it is a word or a phrase. For example, often a word can be used as a noun or a verb, or an adjective or adverb, etc. The same word functioning as a noun or a verb can carry different meanings. For example, the English word "book" can be a noun referring to a written piece of work, such as in "I read a book", and can also be a verb referring to an act of making a reservation, such as "I want to book a ticket". Identifying the parts of speech of a term representing an object or a concept can help more accurately determine the associations between the property terms and the object or concept.

As is in the traditional grammatical study, in the present invention, the term "parts of speech" refers to the classes or categories of word or phrases as they are used in a sentence. In traditional grammar, each word in a sentence can be labeled with a class name such as a "noun", "pronoun", "verb", "adjective" "adverb", "preposition", "article" "conjunction" and other classes. Also in the traditional grammar, the grammatical role of the "subject" of a sentence always has the parts of speech of a noun or a noun phrase. The predicate of a sentence typically consists of a verb, either with or without another noun as its object, such as in "The Sun rises" where the verb "rises" is an intransitive verb that does not take a direct or indirect object, and in "John wrote books" in which the transitive verb 'wrote" has a direct object of "books". The predicate can also consist of a link verb such as "is", "am", "are", etc., plus an adjective or a noun or a noun phrase, that are sometimes referred to as the "predicative". For example, in the sentence "John is a smart boy", the word "John" is the subject, and "is a smart boy" is the predicate, with "is" being the linking verb, and "a smart boy" being a predicative.

The parts of speech of a word can usually be obtained from a dictionary, or by context analysis.

In some embodiments, the present invention determines the association strength value of a property term based on the either the grammatical role or the parts of speech of the object name as a contextual information. In the same way as in the above referenced disclosure with grammatical roles, the present invention can also identify the parts of speech of the object name, and assign a weighting co-efficient based on the parts of speech of the object name. For example, if the object name is a noun, the entire text unit containing the object name, or each term in the text unit that contains the object name can be assigned a weighting co-efficient of 0.9, or 0.8 or 0.7, etc., if the parts of speech of the object name is a verb, adjective or adverb, etc.

In some embodiments, in addition to using the grammatical attributes such as the grammatical roles and parts of speech as described above, the present invention further uses semantic attributes of terms in the text unit for determining the associations of property terms and their strength values.

Words or phrases in a language carry meanings. In the present disclosure, the various meanings a word carries are referred to as the semantic attributes of the word. The semantic attributes can also include semantic roles of a word or phrase, such as the role of an "actor" of an action, as with the word "John" in "John broke the window", etc., and semantic attribute types such as whether a word is a product name, or carries an opinion, or attribute values such as whether the word carries a positive or negative opinion, etc.

In some embodiments, the method of using a weighting co-efficient for determining associations using the grammatical attributes can also be applied to semantic attributes when available. For example, in one embodiment, when weighting co-efficient is used, a term that is the "actor" of an action (such as the word "John" in "John broke the window") may be assigned a weighting coefficient of 0.9, while a term that is the "recipient" of an action (such as the word "window" in "John broke the window") can be assigned a weighting coefficient of 0.8; a term that is an "instrument" (such as the word "stone" in "John broke the window with a stone") can be assigned a weighting coefficient of 0.6; and a term that indicates a state or an attribute (such as the word "running" in "John is running") can be assigned a weighting coefficient of 0.4, etc.

In another embodiment, different weighting coefficient values can be assigned to the terms according to their semantic attributes types or values, or meanings. For example, a term that is the name of a product or service such as "computer" or "consulting" may be assigned a weighting coefficient of 0.9, while a term that indicates an interest such as "like", "interested in", etc., can be assigned a weighting coefficient of 0.8; a term that indicates a positive opinion such as "good", or "fantastic", etc., can be assigned a weighting coefficient of 0.6; and a term that indicates a negative opinion can be assigned a weighting coefficient of 0.5, etc.

The semantic role of a term in a document can be obtained from semantic analysis using methods of user's choice. The semantic attributes or attribute type or value of a term can be obtained from a dictionary lookup, sometimes also with context analysis.

In some other embodiments, two or more of the above weighting coefficient values can be combined to determine the association of a property term, such as whether an object or concept name occurs as a noun, or as the subject of a sentence, or also as a product or person name, etc.

In addition to using the grammatical and semantic attributes of a term as contextual information for determining the associations of property terms to an object or concept, in some embodiments, the presence or absence of a specific term can be used as contextual information. For example, for a sentence containing the word "free", other terms in the sentence can be assigned a weighting co-efficient of larger or smaller value to indicate whether the terms occurring with the word "free" is more or less likely to be a associated with a certain object or concept, such as being associated with a spam email, or with a political topic on freedom. In some other embodiments, the presence or absence of a specific group of terms sharing the same attributes can be used as contextual information. For example, the words like "computer", "camera", etc., can be considered to have the same semantic attribute of being a product name or category, and a weighting co-efficient can be determined for other terms on the same sentence or paragraph or document to indicate the likelihood of the other terms being property terms associated with the product.

Furthermore, the grammatical attributes of such specific terms in the text unit can also be used as additional contextual information to indicate the likelihood of the other terms in the same text unit being property terms associated with the product.

In some embodiments, the position of such terms in the text unit such as a phrase or a sentence or paragraph can also be used as contextual information to indicate the likelihood of the other terms in the same text unit being property terms of the specified object or concept. For example, if the object name occurs as the first or the last word of a phrase or a sentence, or in the first or second half of a sentence, different weighting co-efficient values can be used to indicate the likelihood of the other terms in the same sentence being property terms.

In some other embodiments, for a given term, the distance between the term and the object or concept name in the same text unit can be used as additional contextual information to indicate the likelihood of the term being a property term of the specified object or concept. For example, if a term is one or two words or phrases away from the object or concept name in the same text unit, either before or after the object or concept name, different weighting co-efficient values can be used to indicate the likelihood of the term being a property term associated with the object or concept.

In some other embodiments, in addition to using the grammatical or semantic or positional attributes of an object name or a plurality of such object or concept names to determine the value of a weighting co-efficient for other terms in the text unit as potential property terms, the same method can also be applied to the potential property terms in the text unit to indicate their association strength in a specific context. For example, if the word "book" is found to be associated with the object or concept name of "travel", finer distinctions can be made to indicate how closely the word "book" is associated with "travel" when the word "book" is a subject of a sentence, such as in "the book is about travel", or when the word is a verb of a sentence, such as "I want to book with a travel agency", etc. In such cases, additional association strength values can be produced for the specific context. FIG. 9 is an example of the output of a dataset with multiple association strength values for different context for the object "computer", in which the association strength value 1 can be the overall strength, and association strength value 2 can be the strength under a specific context.

Furthermore, the grammatical or semantic or positional attributes of a potential property term can also be used to determine the association strength value of the potential property term itself, in combination with such attributes associated with the object or concept name described above. In some embodiments, an additional weighting co-efficient for a potential property terms in the text unit based on the grammatical or semantic or positional attributes of the potential property term can be used in determining the association strength of the property terms, in combination with the attributes of the object or concept name, As is described in the referenced disclosure recited above, natural language contents generally follow certain grammatical rules in conveying information. In the referenced disclosure, the focus of determining the associations between the terms or concepts is on natural language contents. In the present disclosure, the methods of determining the associations are further extended to include other data contents that contain non-natural language contents or contents that do not necessarily follow grammatical rules like natural languages, such as contents containing numerical data other symbols, such as various records in a database, and the database can be of various types including relational, non-relational, real-time or in-memory or disk-based databases.

Determining associations using contextual information in both natural language and non-natural language data types can help in solving many practical problems, such as spam email filtration, and fraud detection, and other types of pattern recognition, etc. Conventional machine-learning methods usually do not take context into consideration due to various technical limitations within the methods. As such, the accuracy of the conventional methods is often not high enough. The present invention provides methods for more accurately identifying the potential properties that are associated with certain events or patterns. Whether the data contents contain numerical data or non-language symbol, each data point means something. For example, a number such as 10 can mean many things under different context. Whether it is a number or a symbol of some kind, they can all have certain types of semantic or positional attributes or attribute types or values. In some cases, strings of symbols can also have their own grammatical attributes, such as codes in a computer program. For a given number or symbol, in determining what other numbers or symbols may be associated with it, the present invention uses such semantic or positional or distance attributes as contextual information for more accurately identifying the strength or degree of association. The same method of assigning weighting co-efficient based on the semantic attributes as described above for natural language content can also be used for non-natural language contents. For example, if an event or entity or pattern is known to be associated with a number greater than 10, then depending on the specific needs, other values or symbols in the same record can be assigned a weighting co-efficient of either a larger or smaller value, to indicate the contextually dependent potential associations of the other numbers or symbols in the same record with the event or entity or pattern that is of interest.

In some embodiments, whether the training data contain natural language or non-natural language contents, the target object or concept name is not represented by a specific term, such as "computer" or "accounting", but by the name of a semantic attribute or its description. For example, when the training data is selected from some fraudulent emails or data related to some fraudulent activities, or certain user behavior such as purchasing, etc., the data contents may not necessarily contain the specific term of "fraudulent emails" or "spam emails" or "fraudulent activities", etc. In such cases, the concept or object is represented by a semantic attribute or a description of such attributes, which can also serve as a criterion for selecting the training data. The associations discovered with data selected by such a criterion are the associations between the terms or symbols in the training data with the attribute or its description, or the selection criterion. And the system and methods disclosed in the present invention can be applied to discovering or identifying properties that are associated with certain activities, such as fraudulent or spam emails or activities, specific user behavior patterns of various types.

As is described in the referenced disclosure recited above, the potential property terms of an object or concept can be identified by using the internal association strength and the external association strength obtained by using both the internal training data and external training data when the external training data is generic enough, or is randomly selected to a large extent. In some embodiments, in addition to using the methods described above, the potential property terms can also be identified to a certain extent by using a known classifier such as the nae Bayes classifier, by treating the external random data set as a contrasting class, and the internal data set as the target class. The features identified by such a classifier under the specific data selection condition as described above can be used as the property terms that are associated with the target class of the text contents, when the target class is defined to be associated with an object or a concept using the criterion described above.

Furthermore, contextual attributes of terms or symbols can also be used as described above when using a classifier for the purpose of finding association data, whether it is in natural language contents or not, and whether it is for association with a concept represented m by a word or phrase, or with a name or description of an attribute or a criterion for selecting the training data, such as finding association data in the training data for detecting fraud, spam, etc.

Data Structure for Associative Knowledgebase and Associative Memory

Figure 10:
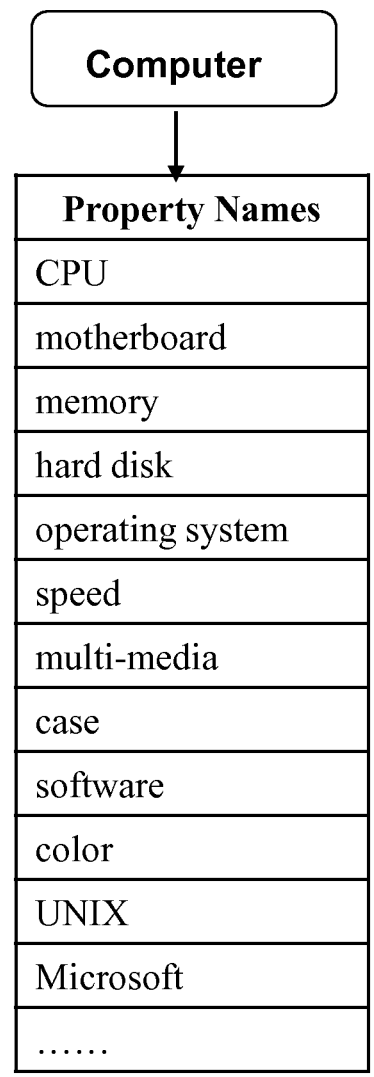
FIG. 10 show an example of a one-column dataset adapted from FIG. 1 in accordance with the present invention.

The system and methods of the present invention produce an association dataset for a given object or concept or topic. FIG. 1 is an example of such dataset. The dataset can be stored or display or used in different formats. The simplest format is a list of the associated terms without also displaying the association strength for each term, such as the one illustrated in FIG. 10. This can reduce the space requirement when the association strength values are not important to specific use cases.

In some other embodiments, when there are more than one datasets, the datasets can be organized into different formats.

In one embodiment, each dataset can be treated as a term vector, and the plurality of the term vectors representing the plurality of the concepts or objects can be organized into a term-concept or term-topic matrix, in which the values of the association strength can be zero for all terms that are not contained in a specific dataset. FIG. 11 illustrates the structure of such a term-concept or term-topic matrix.

In FIG. 11A, concept names are shown in 1110, and terms are shown in 1120. The values 1130 are either 1 or 0, indicating whether a term is a property term of the concept or not. In FIG. 11B, the values can be exemplarily between 0 and 1, indicating the association strength of the term as a property term of the concept. In some embodiments, the values can be either greater or smaller than the examples in FIG. 11B.

Figure 12:
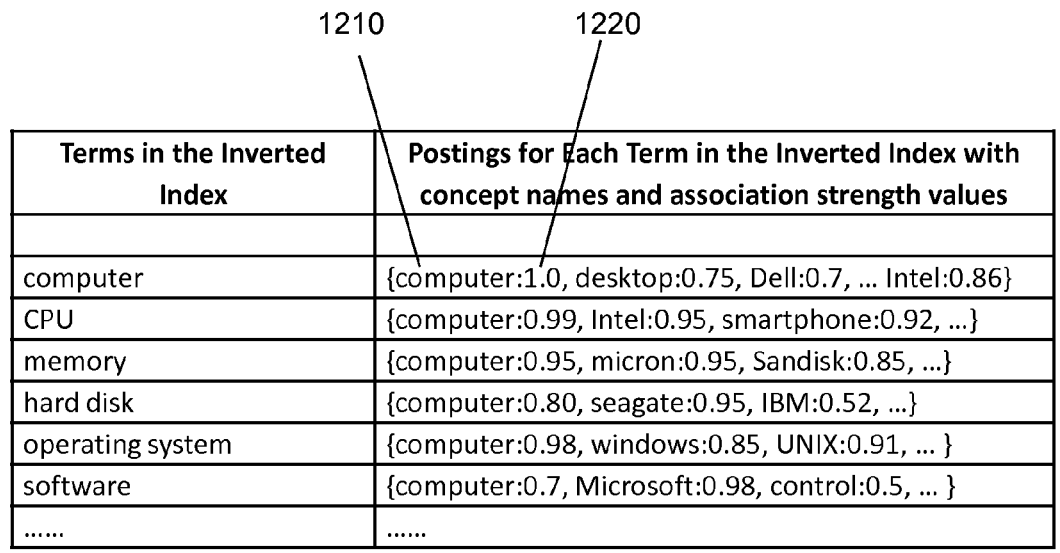
FIG. 12 illustrates the structure of a term-concept or term-topic inverted index in accordance with the present invention.

In some other embodiments, the plurality of the term vectors representing the plurality of the concepts or objects can be merged into an inverted index of terms each with pointers to the concept dataset names that contain the term, and optionally, also to their respective association strength or weight values. In some embodiments, if the association strength value is below a threshold, the entry can be removed from the pointers to reduce storage space or processing requirements. Such pointers are sometimes known as postings of an index. FIG. 12 illustrates an exemplar structure of such a term-concept or term-topic inverted index, with concept names such as "computer", "desktop", "Dell", "Intel", etc. (1210), and their corresponding hypothetical association strength values (1220).

Figure 13:
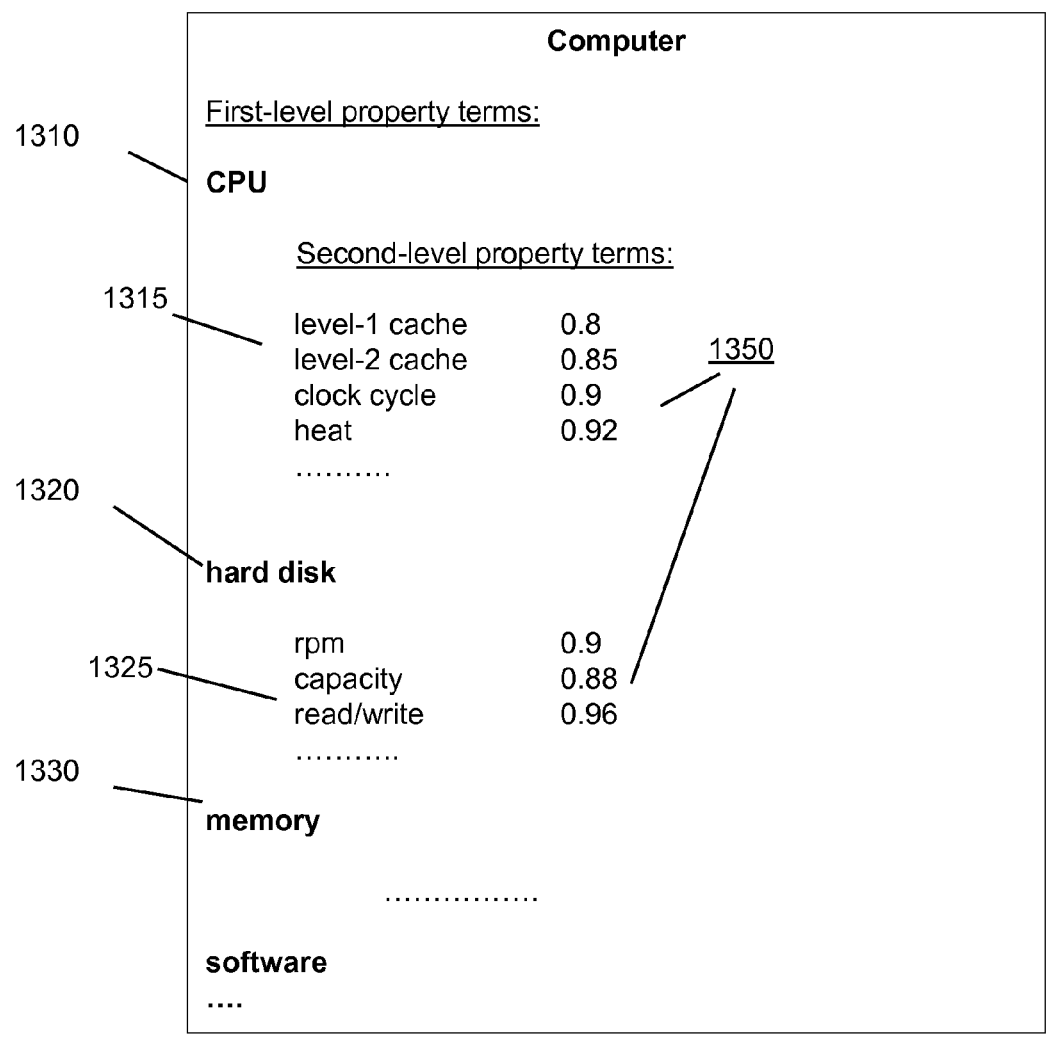
FIG. 13 illustrates an exemplar hierarchical structure of object or concept and properties associative relationships in accordance with the present invention.

Furthermore, in some other embodiments, the multiple datasets can form a hierarchical structure representing different levels of association data. FIG. 13 is an exemplar illustration of the structure. In FIG. 13, one or more of the property terms (1310, 1320, 1330) in a dataset can have a second-level association dataset (1315, 1325), comprising one or more property terms that are associated with the property term on the first level. Like in the first-level dataset illustrated in FIG. 1, FIG. 9 and FIG. 10, each second-level property term can also have one or more columns of corresponding association strength values (1350). The methods described above can be recursively applied to form more levels in the hierarchical structure.

When the number of datasets is large enough and covers a wide enough scope of topics or object or concepts, both the table or matrix format or the hierarchical tree format can be used as a form of what is known as an ontological knowledge-base. When it is in the table or matrix format, the numbers in each cell indicates the semantic distance or closeness of a term to a concept or a topic represented by the term in the column heading. It is a way of connecting words in the vocabulary of a language, and indicating their conceptual relationships in terms of a quantitative measurement of closeness. When it is in the format of a hierarchical tree, it can be used as a special ontology that represents the object-property associations between various object, entities or concepts. Both formats can be used as simulating a form of what is known as associative memory.

It should be understood that the above-described methods are not limited to the specific examples used. Applications of the presently disclosed system and methods are not limited to the above examples, either. Configurations and processes can vary without deviating from the spirit of the invention.

What is claimed is:

1. A computer-implemented method for producing an association dataset for terms in a language, comprising:
   receiving a first term as a name or description of a concept or topic or attribute;
   receiving a first group of text units comprising at least two terms each comprising one or more words or phrases or sentences or paragraphs or documents, at least half of the text units contain the first term or are from contents that contain the first term, and at least half of the text units contain one or more second terms each being different from the first term;
   for one or more second terms in the first group, produce a first score value based on the number of text units that contain both the first term and the second term, and a semantic attribute associated with the first term in the text unit, wherein the semantic attribute includes a semantic role, a semantic attribute type or attribute value, or a meaning of the first term or the one or more second terms; and
   selecting the one or more second terms based on the first score value as terms associated with the first term or with the concept or topic or attribute represented by the first term.

2. The method of claim 1, wherein the one or more second terms are selected if the first score value of the term is above a predetermined threshold, the method further comprising:
   outputting the one or more selected terms, or also outputting the first score value to represent the strength of association between the one or more second terms and the first term or the concept or topic or attribute represented by the first term.

3. The method of claim 1, further comprising:
   associating a first weighting co-efficient to the semantic attribute, wherein the first score value is produced based on the first weighting co-efficient.

4. The method of claim 1, wherein the first score value is produced further based on whether the text unit is or contains a phrase or a sentence or a paraphrase or a document or a plurality of documents.

5. The method of claim 4, further comprising:
   determining a second weighting co-efficient based on whether the text unit is or contains a phrase or a sentence or a paraphrase or a document or a plurality of documents, wherein the first score value is produced based on the second weighting co-efficient.

6. The method of claim 1, further comprising:
   identifying a contextual attribute for the second term, wherein the contextual attribute includes at least a grammatical attribute or a semantic attributes or a positional attribute associated with the second term or a term in the context of the second term, wherein the grammatical attribute includes at least the grammatical roles of subject, predicate, part of a predicate, a modifier or a head of a phrase, or a sub-component of a phrase, and parts of speech, wherein the semantic attributes includes at least semantic roles or attribute types or values or meanings, wherein the positional attribute includes at least the position of the term in the text unit; and
   producing a second score based on the contextual attribute, or modifying the first score value based on the contextual attribute.

7. The method of claim 1, wherein the first score value is further divided by at least half of the total number of the text units in the first group.

8. A computer-implemented method for producing an association dataset for terms in a language, comprising:
   receiving a first term as a name or description of a concept or topic or attribute;
   receiving a first group of text units comprising at least two terms each comprising one or more words or phrases or sentences or paragraphs or documents, at least half of the text units contain the first term or are from contents that contain the first term, and at least half of the text units contain one or more second terms each being different from the first term;
   for one or more second terms in the first group, produce a first score value based on the number of text units that contain both the first term and the second term, and the distance between the first term and the second term in the text unit, wherein the distance is defined as the number of terms between the first term and the second term in the text unit; and selecting the one or more second terms based on the first score value as terms associated with the first term or with the concept or topic or attribute represented by the first term.

9. The method of claim 8, wherein the one or more second terms are selected if the first score value of the term is above a predetermined threshold, the method further comprising:

outputting the one or more selected terms, or also outputting the first score value to represent the strength of association between the one or more second terms and the first term or the concept or topic or attribute represented by the first term.

10. The method of claim 8, further comprising:

determining a first weighting co-efficient based on the distance between the first term and the second term, wherein the first score value is produced based on the first weighting co-efficient.

11. The method of claim 8, wherein the first score value is produced further based on whether the text unit is or contains a phrase or a sentence or a paraphrase or a document or a plurality of documents.

12. The method of claim 8, further comprising:

associating a second weighting co-efficient to the text unit based on whether the text unit is or contains a phrase or a sentence or a paraphrase or a document or a plurality of documents, wherein the first score value is produced based on the second weighting co-efficient.

13. The method of claim 8, further comprising:

identifying a contextual attribute for the second term, wherein the contextual attribute includes at least a grammatical attributes or semantic attribute or position, wherein the grammatical attribute includes at least the grammatical roles of subject, predicate, part of a predicate, a modifier or a head of a phrase, or a sub-component of a phrase, and parts of speech, wherein the semantic attributes includes at least semantic roles or attribute types or values or meanings, and producing a second score value based on the contextual attribute, or modifying the first score value based on the contextual attribute.

14. The method of claim 8, wherein the first score value is further divided by at least half of the total number of the text units in the first group.

15. A computer-implemented method for producing an association dataset for terms in a language, comprising:

receiving a first term as a name or description of a concept or topic or attribute;

receiving a first group of text units comprising at least two terms each comprising one or more words or phrases or sentences or paragraphs or documents, at least half of the text units contain the first term or are from contents that contain the first term, and at least half of the text units contain one or more second terms each being different from the first term;

receiving a third term comprising a word or a phrase;

for one or more second terms in the first group, produce a first score value including a weighting value based on the presence or absence of the third term in a text unit that contains the second term; and selecting the one or more second terms based on the first score value as terms associated with the first term or with the concept or topic or attribute represented by the first term.

16. The method of claim 15, wherein the one or more second terms are selected if the first score value of the term is above a predetermined threshold, the method further comprising:

outputting the one or more selected terms, or also outputting the first score value to represent the strength of association between the one or more second terms and the first term or the concept or topic or attribute represented by the first term.

17. The method of claim 15, further comprising:

determining a first weighting co-efficient based on the presence or absence of the third term in the text unit, wherein the first score value is produced based on the first weighting co-efficient.

18. The method of claim 15, wherein the first score value is produced further based on whether the text unit is or contains a phrase or a sentence or a paraphrase or a document or a plurality of documents.

19. The method of claim 18, further comprising:

determining a second weighting co-efficient based on whether the text unit is or contains a phrase or a sentence or a paraphrase or a document or a plurality of documents, wherein the first score value is produced based on the second weighting co-efficient.

20. The method of claim 15, wherein the first score value is produced further based on the number of text units that contain both the first term and the second term.

* * * * *